J. MESZAROS.
CHICKEN HOUSE.
APPLICATION FILED APR. 12, 1920.

1,367,416.

Patented Feb. 1, 1921.

Janos Meszaros. INVENTOR

WITNESS ATTORNEY

J. MESZAROS.
CHICKEN HOUSE.
APPLICATION FILED APR. 12, 1920.
1,367,416.
Patented Feb. 1, 1921.
3 SHEETS—SHEET 2.
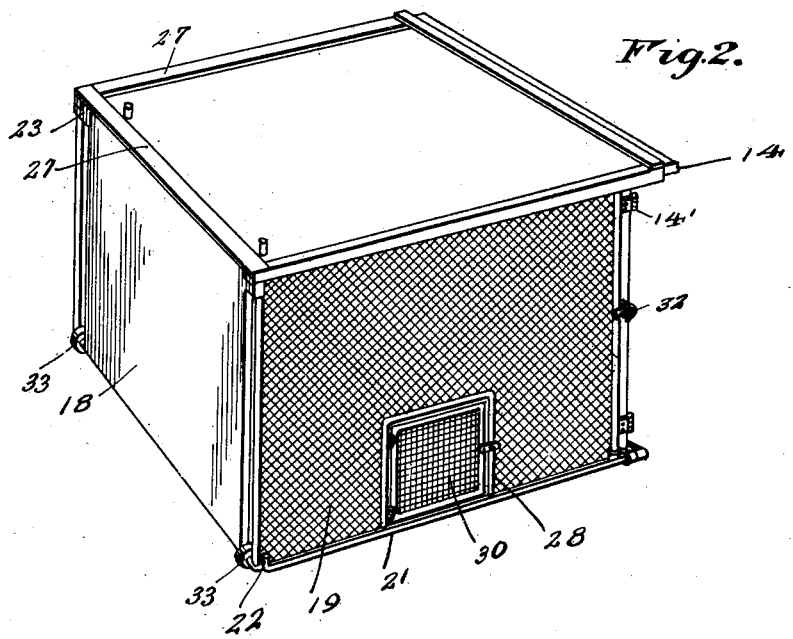
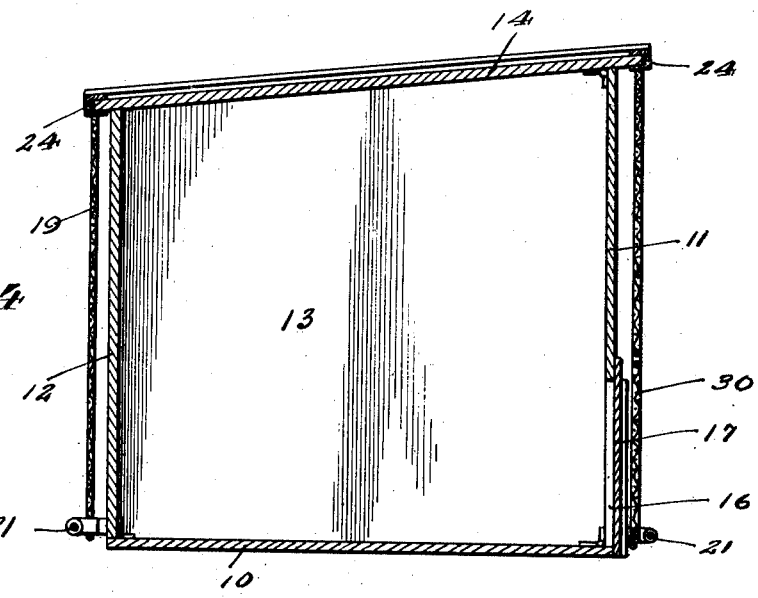
Janos Meszaros
INVENTOR J. MESZAROS.
CHICKEN HOUSE.
APPLICATION FILED APR. 12, 1920.
1,367,416.
Patented Feb. 1, 1921.
3 SHEETS—SHEET 3.
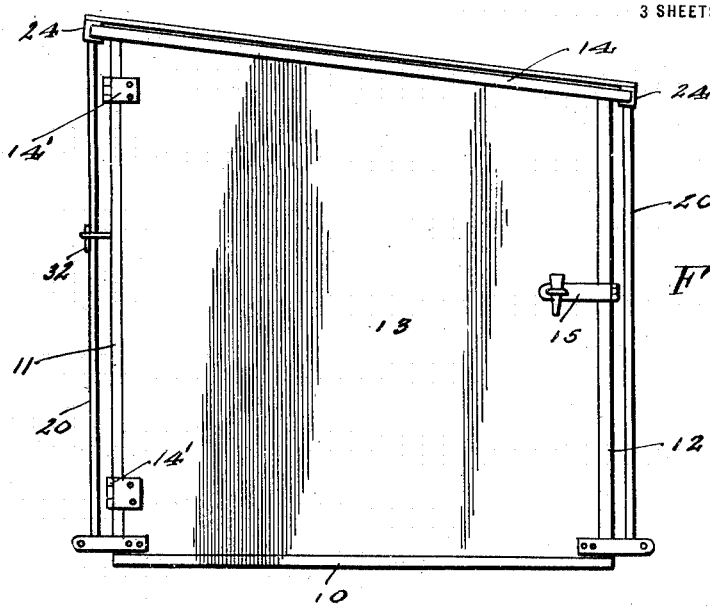
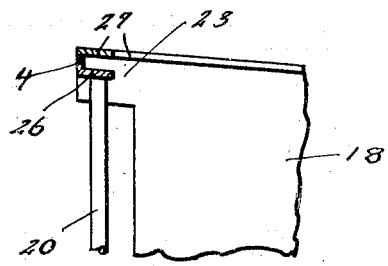
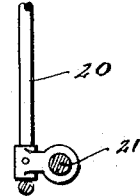
Fig. 6.
Fig. 7.
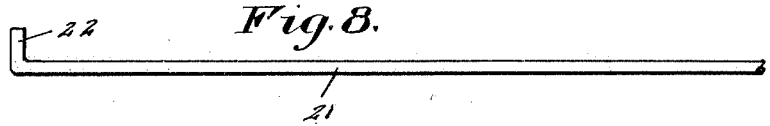
Fig. 8.
R. A. Thomas
WITNESS
Janos Meszaros INVENTOR
BY Victor J. Evans
ATTORNEY

UNITED STATES PATENT OFFICE.

JANOS MESZAROS, OF EAST MILLSBORO, PENNSYLVANIA.

CHICKEN-HOUSE.

1,367,416.     Specification of Letters Patent.     Patented Feb. 1, 1921.

Application filed April 12, 1920. Serial No. 373,189.

*To all whom it may concern:*

Be it known that I, JANOS MESZAROS, a citizen of Hungary, residing at East Millsboro, in the county of Fayette and State of Pennsylvania, have invented new and useful Improvements in Chicken-Houses, of which the following is a specification.

The present invention has reference to an improvement in poultry houses.

An object is to produce a poultry house that has associated therewith a slidable member which, when in extended position opens one end of the poultry house and provides a run for the poultry, without permitting the escape of the latter or subjecting them to danger from the elements or from enemies.

A further object is to produce a poultry house including a fixed section and a movable section which is slidable over and away from the fixed section in one direction, said movable section when in its extended position opening one of the ends of the fixed section and providing a run for the fowls.

A further object is to produce a poultry house including a fixed and a slidable section, the outer end portion of the slidable section providing one of the ends of the fixed section, when the slidable section is in normal position on the fixed section, the slidable section, when extended providing a run for the fowls, both of the sections being provided with doors which aline, when the sections are in normal position to permit access being obtained to the fixed section of the poultry house, and the door of the slidable section permitting access to be obtained to the run when the slidable section is extended.

The foregoing, and other objects which will appear as the nature of the invention is better understood, may be accomplished by a construction, combination and operative arrangement of parts, such as is disclosed by the drawings.

In the drawings:—

Fig. 2 is a similar view but showing the slidable member moved over the poultry house, closing the open end of the latter.

Fig. 4 is an approximately central vertical transverse sectional view taken through the construction as illustrated in Fig. 2.

Fig. 5 is a view looking toward one end of the house proper.

Figs. 6 to 8 illustrate details.

Figure 1:
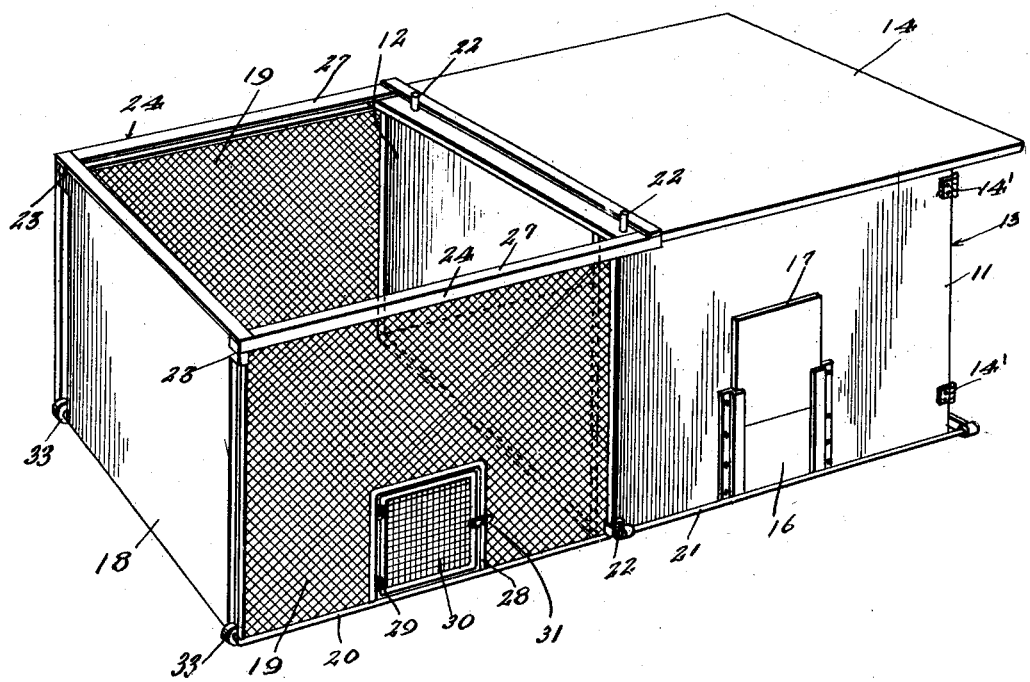
Figure 1 is a perspective view showing the slidable member extended to provide a runway for the poultry house.
Figure 3:
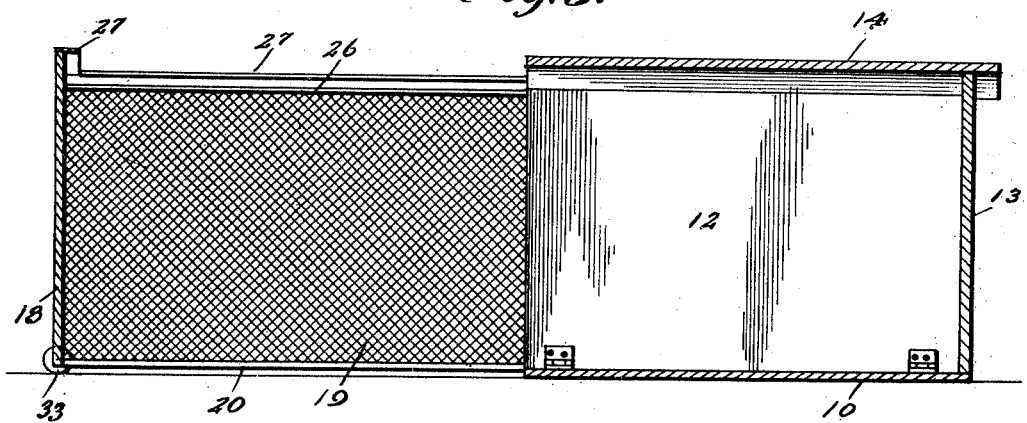
Fig. 3 is an approximately central vertical longitudinal sectional view taken through the construction illustrated in Fig. 1.

The poultry house, constructed in accordance with my present invention, may be of any desired size, shape and proportion, and also may be of a collapsible nature, that is one in which the bottom may be hingedly connected to the sides, the end hingedly connected to one of the sides and having locking engagement with the other side and a top which is hingedly connected to one of the sides and which is also latched to the opposite side.

The poultry house includes a base 10 to which is secured the sides 11 and 12 and the end 13. Over the sides and end there is a top or roof 14 which is arranged at a pitch or inclination so that water will be shed therefrom. The end 13 is hingedly secured, as at 14' to the side 11 and has a latching engagement, 15, with the second side 12. The side 11 is provided with a cutaway portion providing a doorway 16, the same being normally closed by a preferably slidable door 17.

The poultry house, constructed as above described, it will be noted, produces a structure in which one of the ends is open. The top or roof plate 14, it should be stated projects a suitable distance beyond the sides, and if necessary beyond the ends of the house proper. The open end of the construction is designed to be closed by an end plate 18. This plate 18 has secured to its edges side plates 19. The side plates are of reticulated material, being preferably in the nature of wire mesh secured to a suitable frame 20. The frame has its lower edge received in guideways 21 on the lower edges of the sides 11 and 12 of the house proper. Between the frame 20 and the open end of the house there is stop means 22 for limiting the outward movement of the frames 20 and the end member 18 connected therewith. The frames are of a length whereby, when the same are moved longitudinally over the sides of the house proper, to bring the end member 18 to a position to close the open end of the house proper. The member 18, at its upper corners has outwardly extending lug portions 23 to which are secured longitudinally extending plates 24 that have their lower edges provided with inturned flanges 26 that are secured to the upper edges of the frames 20. To the upper edges of the members 20 and to the upper edge of the member 18 there is secured a plate 27. This plate has one of its ends at all times resting on the top 14 of the poultry house proper and the same is slidable over the said top. The elements 24 and 25 provide guideways for the projecting edges of the top 14. The slidable member is not provided with a base, so that the fowls are thus permitted to dig and grub in the ground surrounded by the said slidable member which incloses the runway for the fowls.

One of the frames 20 has an opening therein, and the edges of the reticulated plate 19 at the said opening are received in a suitable frame 28. To one side of this frame there is hinged, as at 29 a reticulated door 30. The door is latched as at 31 to normally close the opening. The door 30 is so positioned as to be brought directly opposite the door 16 when the slidable part of the construction is moved over the fixed part thereof, so that the fowls may be permitted a passage from the house through these alining doorways.

If desired the slidable portion of the construction may have rollers 33 at the outer corners thereof so that the same is freely movable through the guideways provided therefor. In addition to this securing means 32 is provided for locking the slidable member on the permanent member, and it is thought that the foregoing description, when taken in connection with the drawings will fully set forth the construction and advantages thereof to those skilled in the art to which such inventions relates.

Having thus described the invention, what I claim is:—

A poultry house comprising a fixed section having an open end and a movable section slidable over the fixed section, said fixed section having guides on the sides thereof, a doorway in one of said sides, a door for closing the doorway, said movable section including reticulated side plates arranged in the guides on the sides of the fixed section, one of said plates having a doorway registering with the doorway of the fixed section, a door closing the last mentioned doorway, a plate on the end of the movable section secured to the outer ends of the reticulated side plates, outwardly extending lugs on the upper corners of the last mentioned plate, U-shaped members secured to the reticulated side plates and to said lugs, and a top plate for the movable section secured to the said U-shaped members and overlying the top of the fixed section, and rollers on the outer and lower ends of the reticulated side plates of the movable section.

In testimony whereof I affix my signature.

JANOS MESZAROS.